United States Patent
Hidaka

(10) Patent No.: US 10,690,062 B2
(45) Date of Patent: Jun. 23, 2020

(54) GAS ENGINE

(71) Applicant: Yanmar Co., Ltd., Osaka-shi, Osaka (JP)

(72) Inventor: Hiromitsu Hidaka, Osaka (JP)

(73) Assignee: YANMAR CO., LTD., Osaka (JP)

( * ) Notice: Subject to any disclaimer, the term of this patent is extended or adjusted under 35 U.S.C. 154(b) by 195 days.

(21) Appl. No.: 15/314,704

(22) PCT Filed: Apr. 20, 2015

(86) PCT No.: PCT/JP2015/061978
§ 371 (c)(1),
(2) Date: Nov. 29, 2016

(87) PCT Pub. No.: WO2015/182288
PCT Pub. Date: Dec. 3, 2015

(65) Prior Publication Data
US 2017/0198646 A1    Jul. 13, 2017

(30) Foreign Application Priority Data

May 30, 2014  (JP) .................. 2014-113265

(51) Int. Cl.
*F02D 9/08*    (2006.01)
*F02M 21/04*   (2006.01)
(Continued)

(52) U.S. Cl.
CPC .................. *F02D 9/08* (2013.01); *F01P 3/20* (2013.01); *F01P 11/16* (2013.01); *F02D 9/02* (2013.01);
(Continued)

(58) Field of Classification Search
CPC .......... F02D 9/08; F02D 31/001; F02D 19/02; F02D 41/0027; F02D 9/02;
(Continued)

(56) References Cited

U.S. PATENT DOCUMENTS

| | | | | |
|---|---|---|---|---|
| 6,978,771 | B2 * | 12/2005 | Kuzuyama | ........ F02D 13/0215 123/294 |
| 2009/0071439 | A1 * | 3/2009 | Shiraishi | ............ F02D 31/002 123/403 |
| 2014/0311448 | A1 | 10/2014 | Nakazono et al. | |

FOREIGN PATENT DOCUMENTS

| | | |
|---|---|---|
| EP | 2225447 B1 | 5/2011 |
| JP | 2010270741 A * | 12/2010 |
| JP | 2013-92082 A | 5/2013 |

OTHER PUBLICATIONS

JP-2010270741-A—English Translation (Year: 2010).*
(Continued)

*Primary Examiner* — Joseph J Dallo
*Assistant Examiner* — Scott A Reinbold
(74) *Attorney, Agent, or Firm* — Norton Rose Fulbright US LLP

(57) ABSTRACT

While providing the control such that the air excess ratio falls within the stoichiometric range, if the throttle opening degree control means determines that a value of the torque is smaller than A [Nm], the throttle opening degree control means provides a first control of controlling the opening degree of the intake throttle valve such that the output shaft rotates at a constant first rotation number. If the throttle opening degree control means determines that the value of the torque is larger than A [Nm], the throttle opening degree control means provides a second control of controlling the opening degree of the intake throttle valve such that the rotation number of the output shaft becomes larger.

12 Claims, 5 Drawing Sheets

(51) Int. Cl.
| | |
|---|---|
| *F02D 9/02* | (2006.01) |
| *F02M 21/02* | (2006.01) |
| *F02D 19/02* | (2006.01) |
| *F02D 31/00* | (2006.01) |
| *F01P 3/20* | (2006.01) |
| *F01P 11/16* | (2006.01) |
| *F02D 41/00* | (2006.01) |

(52) U.S. Cl.
CPC ............ *F02D 19/02* (2013.01); *F02D 31/001* (2013.01); *F02D 41/0027* (2013.01); *F02M 21/02* (2013.01); *F02M 21/04* (2013.01); *F02D 31/002* (2013.01); *F02D 31/007* (2013.01); *F02D 2009/022* (2013.01); *F02D 2200/1002* (2013.01); *F02D 2200/1004* (2013.01); *Y02T 10/32* (2013.01)

(58) Field of Classification Search
CPC ....... F02D 2200/1002; F02D 2009/022; F02D 31/002; F02D 2200/1004; F02D 31/007; F02D 19/023; F01P 11/16; F01P 3/20; F02M 21/02; F02M 21/04; F02M 21/047
USPC ........................................................ 123/434
See application file for complete search history.

(56) References Cited

OTHER PUBLICATIONS

International Search Report (PCT/ISA/210) issued in PCT Application No. PCT/JP2015/061978 dated Jul. 21, 2015, with English translation (five (5) pages).
International Preliminary Report on Patentability (PCT/IB/326, PCT/IB/338, & PCT/IB/373) including Written Opinion (PCT/ISA/237) issued in PCT Application No. PCT/JP2015/061978 dated Dec. 15, 2016 with English translation (10 pages).
Extended Search Report dated Jan. 22, 2018 for EP Application No. 15799648.9.

* cited by examiner

GAS ENGINE

TECHNICAL FIELD

The present invention relates to a gas engine and relates to, for example, a gas engine preferably used in electric generation.

BACKGROUND ART

Conventional gas engines include a gas engine described in JP 2013-92082 A (Patent Document 1). This gas engine is capable of a stoichiometric operation in which an air-fuel mixture is combusted at a value near a theoretical air fuel ratio with a higher rate of a fuel gas. The gas engine enables the stoichiometric operation so as to facilitate generation of a higher torque so that a high output is easily achieved.

On the other hand, it is conventionally known that a so-called knocking tends to occur in a high torque region of a gas engine. Therefore, it is known that a gas engine performing the stoichiometric operation is disposed with a knock detecting means detecting a sign of knocking. If the knock detecting means detects a sign of knocking, the knocking is avoided by retarding an ignition timing etc. In this way, while the high output can easily be achieved, the knocking is avoided to prevent abnormal combustion for protection against a piston damage etc.

However, the conventional gas engine avoids a knocking on the premise of the detection of a sign of the knocking and cannot avoid the sign of the knocking itself. This leads to a problem that the knocking occurring subsequently to a sign of the knocking cannot properly be avoided.

PATENT DOCUMENT

Patent Document 1: JP 2013-92082 A

SUMMARY OF THE INVENTION

Problem to be Solved by the Invention

Therefore, a problem to be solved by the present invention is to provide a gas engine capable of properly avoiding occurrence of knocking.

Means for Solving Problem

In order to solve the problems, a gas engine according to the present invention including:
  a mixer mixing an air and a fuel to generate an air-fuel mixture;
  a cylinder head having an intake port sucking the air-fuel mixture from the mixer;
  an intake throttle valve capable of adjusting a flow rate of the air-fuel mixture flowing from the mixer to the intake port;
  a torque calculating means for calculating a torque of an output shaft;
  an excess ratio identifying means for identifying an air excess ratio of the air-fuel mixture;
  an excess ratio adjusting means for adjusting the air excess ratio;
  a throttle opening degree control means for controlling an opening degree of the intake throttle valve based on a signal indicative of the torque from the torque calculating means; and
  an excess ratio control means for controlling the excess ratio adjusting means such that the air excess ratio falls within a stoichiometric range, wherein
while the excess ratio control means provides the control such that the air excess ratio falls within the stoichiometric range, if the throttle opening degree control means determines that a value of the torque is smaller than a first predetermined value, the throttle opening degree control means provides a first control of controlling the opening degree of the intake throttle valve such that the output shaft rotates at a constant first rotation number or, if the throttle opening degree control means determines that the value of the torque is larger than the first predetermined value, the throttle opening degree control means provides a second control of controlling the opening degree of the intake throttle valve such that the rotation number of the output shaft becomes larger.

If the value of the torque is the first predetermined value, the first control may be provided or the second control may be provided. In this description, the excess ratio identifying means includes not only a means directly identifying the air excess ratio but also a means capable of identifying a physical amount from which the air excess ratio can be calculated (identified), for example, an air-fuel ratio that is a physical amount correlated with the air excess ratio. In this description, the excess ratio adjusting means includes any means capable of adjusting the air excess ratio and, for example, the excess ratio adjusting means includes a means capable of adjusting an air-fuel ratio that is a physical amount correlated with the air excess ratio.

According to the present invention, since the excess ratio control means can provide control such that the air excess ratio of the air-fuel mixture mixed by the mixer falls within a stoichiometric range, the stoichiometric operation can be achieved. Therefore, a high output can easily be achieved.

Additionally, while the excess ratio control means provides the control such that the air excess ratio falls within the stoichiometric range in the first control, if the throttle opening degree control means determines that the torque value is smaller than the first predetermined value, the throttle opening degree control means controls the opening degree of the intake throttle valve such that the output shaft rotates at the constant rotation number. Therefore, by setting the first predetermined value to a value causing no knocking, a knocking does not occur while the first control is provided, regardless of the fact that a high output generation performance can be maintained. Moreover, since the control is provided such that output shaft is set to the constant speed in the first control, the load applied to the engine can efficiently be increased so that the electric generation etc. can be performed with good efficiency.

On the other hand, in the second control, while the excess ratio control means provides the control such that the air excess ratio falls within the stoichiometric range, if the throttle opening degree control means determines that the torque value is larger than the first predetermined value, the throttle opening degree control means controls the opening degree of the intake throttle valve such that the rotation number of the output shaft becomes larger. Therefore, if a larger output is required and the torque value becomes larger, the rotation number of the output shaft becomes larger in the second control and, thus, the torque value hardly rises. This is because a line segment indicative of the same output has the same tendency as a curve representative of inverse proportion on the two-dimensional coordinates of the torque on the vertical axis and the rotation number on the horizontal axis. As a result, when the rotation number becomes larger, the torque is made lower on the curve indicative of the same output.

Thus, when a larger output is required, a rapid rise in the torque can be avoided because the rotation number increases. Therefore, by setting the torque at the time of output of the required maximum output out of knocking occurrence region, a knocking does not occur while the second control is provided.

Therefore, the occurrence of knocking can properly be avoided in the entire period of the stoichiometric operation.

In one aspect, in the second control, the throttle opening degree control means controls the opening degree of the intake throttle valve such that the rotation number increases in accordance with a linear function as the value of the torque becomes larger than the first predetermined value.

According to the above aspect, in the second control, the rotation number increases in accordance with a linear function as the value of the torque becomes larger than the first predetermined value. Therefore, since the torque and the variation value of the rotation number have a simple proportional relation, the second control can easily be provided.

In one aspect, the gas engine includes a cooling water temperature sensor detecting a temperature of a cooling water for suppressing overheating due to combustion of the air-fuel mixture in a combustion chamber, the water temperature sensor outputting a signal indicative of the temperature of the cooling water to the throttle opening degree control means, wherein when determining that the temperature of the cooling water is less than a second predetermined value, the throttle opening degree control means provides a third control of controlling the opening degree of the intake throttle valve such that the output shaft rotates at a constant second rotation number, in preference to the first control and the second control.

If the temperature of the cooling water is at the second predetermined value, the third control may be provided. The second rotation number may be the same as the first rotation number or may be different from the first rotation number.

The possibility of knocking is correlated with the temperature of the cooling water for suppressing overheating due to combustion of the air-fuel mixture and a knocking does not occur when the cooling water is at a predetermined temperature or lower.

According to the above aspect, in the third control, when determining that the temperature of the cooling water is less than a second predetermined value, the throttle opening degree control means controls the opening degree of the intake throttle valve such that the output shaft rotates at a constant rotation number. Therefore, by setting the second predetermined value to a temperature that can be determined as a temperature causing no knocking, the constant speed operation of the output shaft can be achieved without concern about the occurrence of knocking.

Effect of the Invention

The gas engine of the present invention can properly avoid the occurrence of knocking.

EMBODIMENTS FOR CARRYING OUT THE INVENTION

The present invention will now be described in detail with reference to shown forms.

Figure 1:
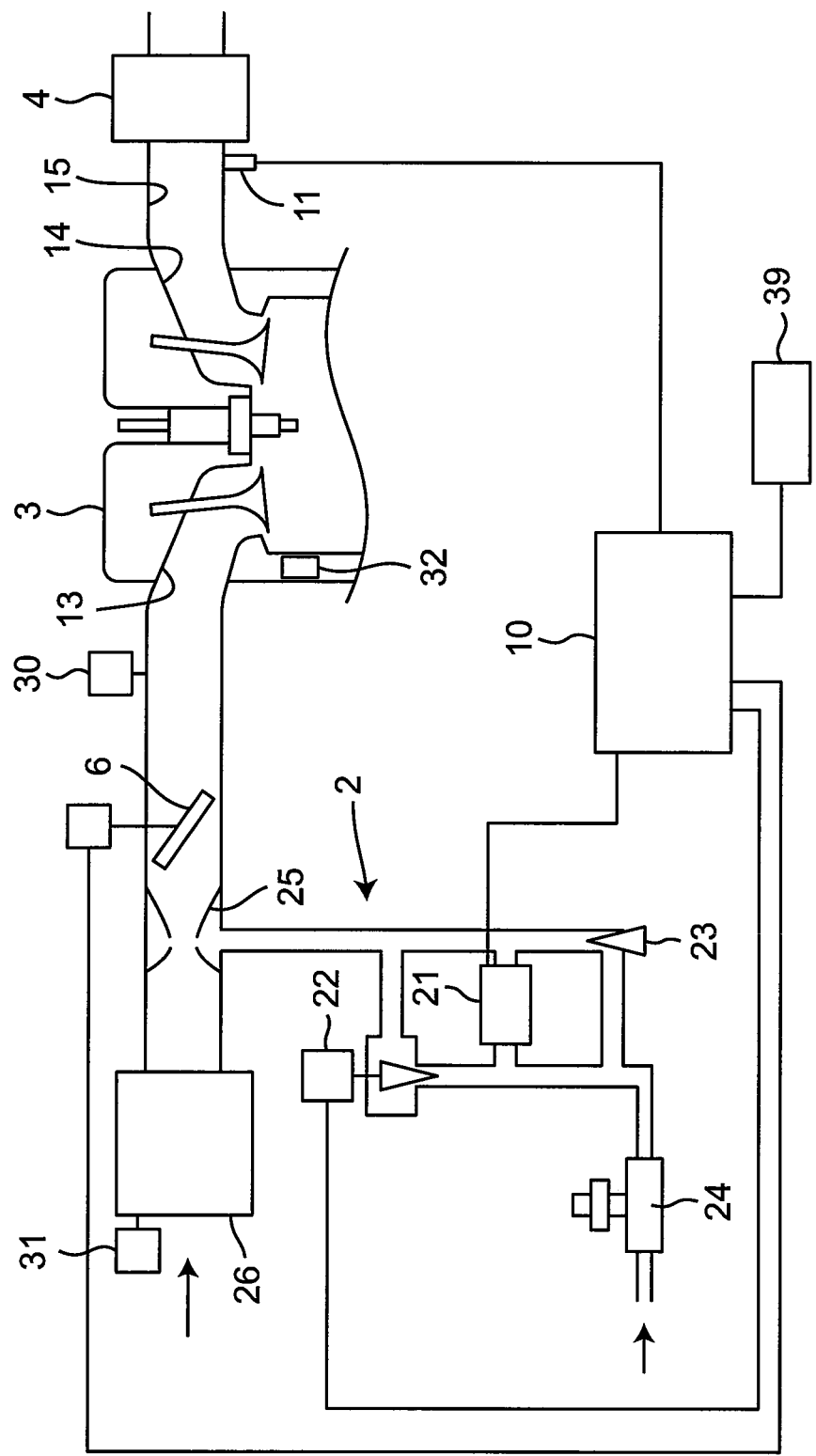
FIG. 1 is a schematic configuration diagram of a gas engine of a first embodiment of the present invention.

FIG. 1 is a schematic configuration diagram of a gas engine of a first embodiment of the present invention.

As shown in FIG. 1, this gas engine includes an intake part 2, a cylinder head 3, a three-way catalyst 4, and an ECU (Engine Control Unit) 10. This gas engine also includes an oxygen sensor 11, an intake air pressure sensor 30, an intake air temperature sensor 31, and a cooling water temperature sensor 32.

The intake part 2 has a solenoid valve 21, an A/F valve 22, a main jet 23, a regulator 24, a mixer 25, and an air filter 26. As shown in FIG. 1, the solenoid valve 21, the A/F valve 22, and the main jet 23 are connected in parallel between the regulator 24 and the mixer 25.

The solenoid valve 21 is made up of a proportional control valve for flow rate characteristics. The solenoid valve 21 is configured to be capable of adjusting an opening area allowing passage of a fuel gas so as to properly control a stoichiometric operation at the air excess ratio ($\lambda=1$) resulting in the theoretical air fuel ratio. In the solenoid valve 21, a valve body configured to close a flow channel due to a biasing force of a flat spring or a spring can be moved by an electromagnetic coil for adjustment to a predetermined opening degree. The solenoid valve 21 opens and closes at the rate of 25 Hz, for example, and has an opening degree adjusted by changing a duty ratio at the time of opening/closing thereof.

It is noted that during the stoichiometric operation, the air excess ratio A may vary from 1 within a range of 0.995 to 1.005. In the present invention, it is assumed that the stoichiometric operation is the operation at the air excess ratio A within the range of 0.995 or more and 1.005 or less. The adjustment of the opening degree of the solenoid valve 21 may be made based on a frequency other than 25 Hz and may be made based on any frequency used in perturbation control.

This gas engine can perform not only the stoichiometric operation but also a lean operation. The A/F valve 22 is made up of a proportional control valve for flow rate characteristics. The A/F valve 22 is configured to be capable of adjusting an opening area of a fuel gas passage so as to control the lean operation at an air excess ratio ($\lambda=1.4$ to $1.6$) resulting in lean combustion. This A/F valve 22 is configured such that an opening degree of a movable valve can be adjusted in multiple stages by rotation of a stepping motor.

The main jet 23 is a valve configured to adjust an amount of a fuel flowing from the regulator 24 to the mixer 25 in conjunction with the solenoid valve 21 and the NF valve 22. The opening degree of the main jet 23 is kept at a constant value. The regulator 24 is responsible for controlling the pressure of the fuel gas so as to always supply the fuel gas at a constant pressure.

The mixer 25 is made up of a Venturi tube mixing an air from the air filter 26 with the fuel gas and mixes the air and the fuel to generate an air-fuel mixture. The mixer 25 mixes the fuel gas and the air due to a Venturi effect of the air sucked in accordance with the opening degree of the intake throttle valve 6 disposed downstream of the mixer 25 in the fuel flow.

The intake part 2 is connected to an intake port 13 of the cylinder head 3. The intake port 13 sucks the air-fuel mixture from the mixer 25, and the intake throttle valve 6 is capable of adjusting a flow rate of the air-fuel mixture flowing from the mixer 25 to the intake port 13. An exhaust port 14 of the cylinder head 3 is connected through an exhaust passage 15 to the three-way catalyst 4. The oxygen sensor 11 is disposed on the exhaust passage 15. Although not described in detail, the gas engine measures the air excess ratio with a well-known method based on a measurement detection result of the oxygen sensor 11.

The intake air pressure sensor 30 detects an intake air pressure downstream of the intake throttle valve 6. On the other hand, the intake air temperature sensor 31 measures a temperature of an air flowing into the air filter 26. The cooling water temperature sensor 32 measures a temperature of a cooling water in a water jacket (not shown) disposed on the cylinder head 3. This engine includes a well-known rotation speed sensor not shown and measures the rotation number of a flywheel (not shown) etc. with the rotation speed sensor so as to detect the rotation number of an output shaft (not shown). In FIG. 1, reference numeral 39 denotes an alarming means generating a warning sound in case of emergency.

Figure 2:
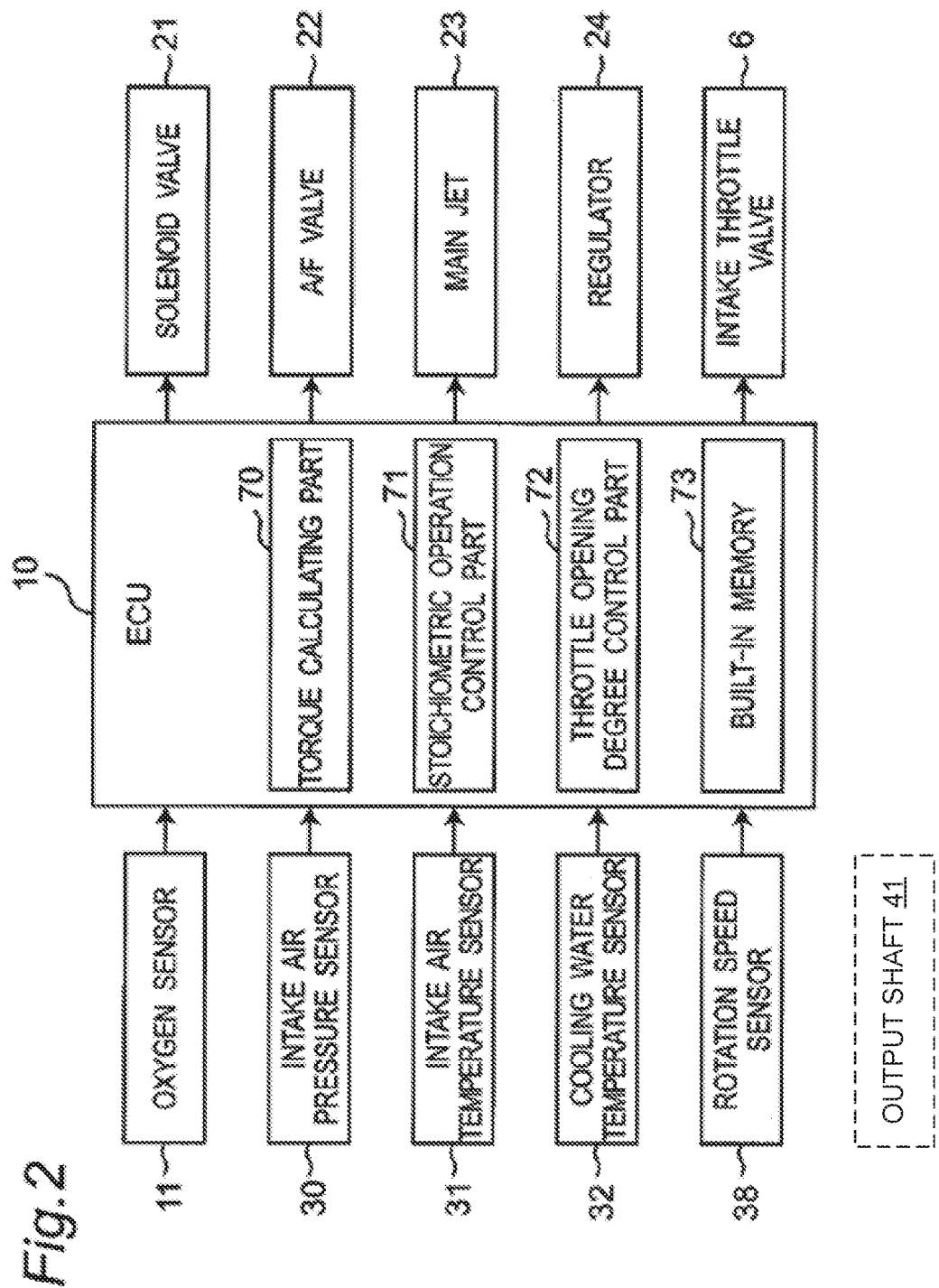
FIG. 2 is a block diagram of an input/output relation between an ECU and parts.

FIG. 2 is a block diagram of an input/output relation between the ECU 10 and the parts.

As shown in FIG. 2, the ECU 10 is connected with the oxygen sensor 11, the intake air pressure sensor 30, the intake air temperature sensor 31, the cooling water temperature sensor 32, a rotation speed sensor 38, the solenoid valve 21, the NF valve 22, the main jet 23, the regulator 24, and the intake throttle valve 6. The ECU 10 receives signals from the oxygen sensor 11, the intake air pressure sensor 30, the intake air temperature sensor 31, the cooling water temperature sensor 32, and the rotation speed sensor 38 to control the solenoid valve 21, the NF valve 22, the main jet 23, the regulator 24, and the intake throttle valve 6. The rotation speed sensor 38 is used to measure the rotation number of a flywheel (not shown) etc. so as to detect the rotation number of an output shaft 41.

The ECU 10 has a torque calculating part 70, a stoichiometric operation control part 71, a throttle opening degree control part 72, and a built-in memory 73. The built-in memory 73 stores a known D-JETRONIC intake air amount calculation formula. The built-in memory 73 also stores a map in which an intake air amount per cylinder and a torque are correlated in a one-to-one relation.

During the stoichiometric operation, the ECU 10 detects an air-fuel ratio with the oxygen sensor 11 and uses a known technique to perform perturbation with the solenoid valve 21. Specifically, during the stoichiometric operation, the stoichiometric operation control part 71 receiving a signal from the oxygen sensor 11 controls the solenoid valve 21 to an opening degree (e.g., 20% to 55%) in an intermediate region of an opening/closing region while opening the NE valve 22 at a predetermined opening degree, for example, the opening degree of 50%. In the control of the solenoid valve 21 at the opening degree in the intermediate region, the opening degree of the solenoid valve 21 is controlled such that the air-fuel ratio varies toward the lean side and the rich side with the state of the theoretical air fuel ratio at the center therebetween. In this way, the air excess ratio of the theoretical air fuel ratio ($0.995 \leq \lambda \leq 1.005$) is achieved.

The oxygen sensor 11 constitutes an excess ratio identifying means, and the NF valve 22 and the solenoid valve 21 constitute an excess ratio adjusting means. The stoichiometric operation control part 71 constitutes an excess ratio control means. During the lean operation, the ECU 10 closes the solenoid valve 21 and controls the opening/closing degree of the A/F valve 22 to provide control of the range of the air excess ratio ($\lambda=1.4$ to 1.6).

When receiving a signal indicative of an intake air pressure from the intake air pressure sensor 30 and a signal indicative of an intake air temperature from the intake air temperature sensor 31, the torque calculating part 70 accesses the built-in memory 73 to calculate an intake air amount per cylinder from the intake air pressure and the intake air temperature by using a known D-JETRONIC intake air amount calculating method in the built-in memory 73. Subsequently, the torque calculating part 70 calculate a torque value based on the calculated intake air amount and the map in the built-in memory 73.

Figure 3:
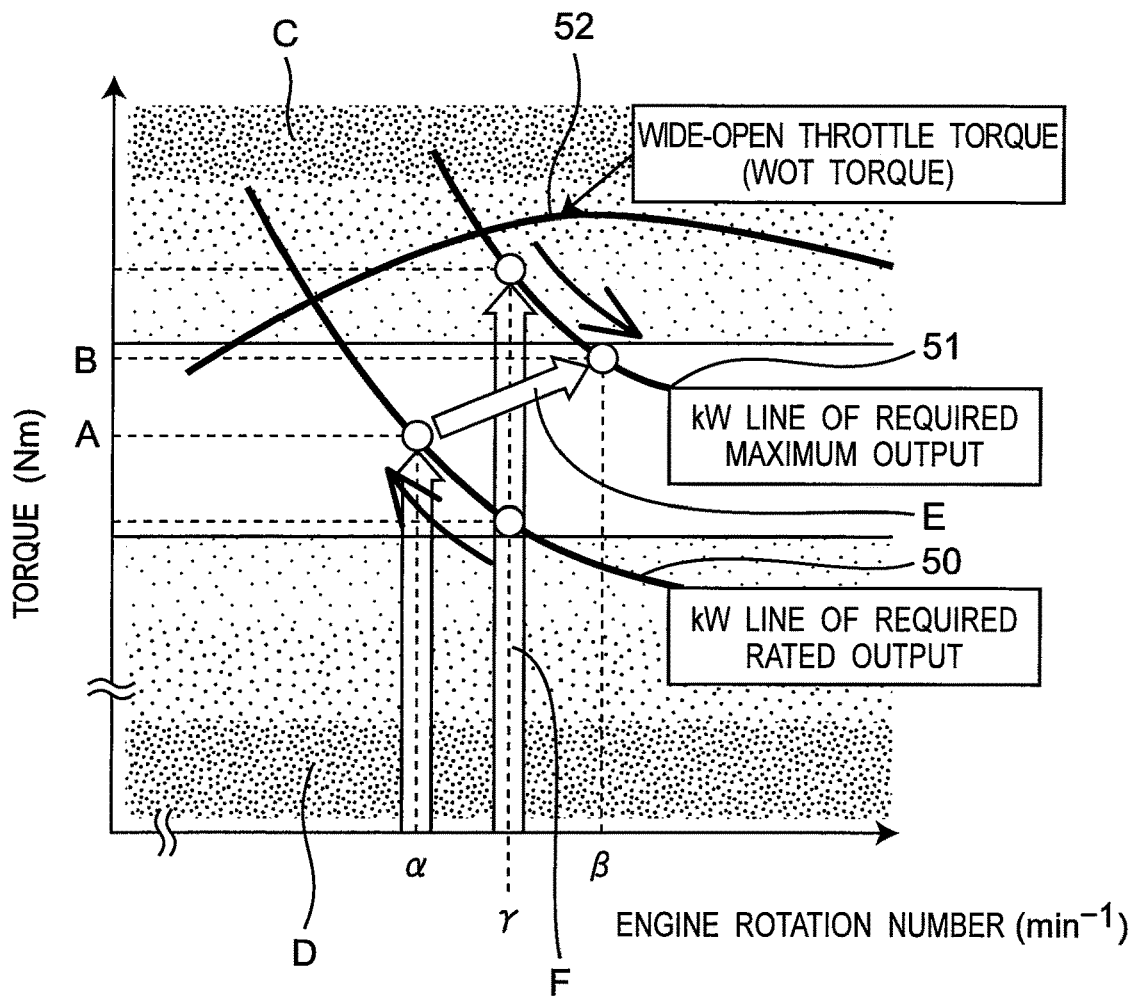
FIG. 3 is a diagram of an overview of control of the gas engine.

FIG. 3 is a diagram of an overview of control of the gas engine and is a diagram of a relation between the engine rotation number and the torque in the gas engine.

This gas engine is connected to an electric generator. In FIG. 3, a curve 50 indicates a kW line of a required rated output and a curve 51 indicates a kW line of a required maximum output. In FIG. 3, a curve 52 indicates a locus drawn by a wide-open throttle torque (WOT torque). In FIG. 3, a region of dot hatching denoted by reference numeral C represents a region in which a knocking (knock) easily occurs (as a torque value becomes larger (as the density of dots becomes higher in the region of C), the knock more easily occurs), and a region of dot hatching denoted by reference numeral D represents a region in which a knocking (knock) hardly occurs (as a torque value becomes smaller (as the density of dots becomes higher in the region of D), the knock more hardly occurs). In the regions C, D, the density of dots is varied in three stages for convenience. However, actually, the region C has the density of dots gradually becoming larger toward the upper side on the plane of FIG. 3, while the region D has the density of dots gradually becoming larger toward the lower side on the plane of FIG. 3.

As shown in FIG. 3, if the torque value calculated by the torque calculating part 70 is equal to or less than A [Nm] defined as a first predetermined value, this gas engine provides control such that the rotation number becomes equal to a first rotation number, $\alpha$ [min$^{-1}$]. Specifically, when receiving from the rotation speed sensor 38 a signal indicative of the rotation number of a1 [min$^{-1}$] smaller than $\alpha$ [min$^{-1}$], the throttle opening degree control part 72 proportionally increases the opening degree of the intake throttle valve 6 based on a rotation number difference, i.e., ($\alpha$-a1) [min$^{-1}$], to increase the rotation number toward $\alpha$ [min$^{-1}$].

On the other hand, when receiving from the rotation speed sensor 38 a signal indicative of the rotation number of a2 [min$^{-1}$] larger than $\alpha$ [min$^{-1}$], the throttle opening degree control part 72 proportionally decreases the opening degree of the intake throttle valve 6 based on a rotation number difference, i.e., (a2-$\alpha$) [min$^{-1}$], to decrease the rotation number toward $\alpha$ [min$^{-1}$]. In this way, the rotation number is kept within the rotation number around the constant speed $\alpha$ [min$^{-1}$] so that the rotation number is always brought closer to $\alpha$ [min$^{-1}$]. In this way, the rotation number is maintained in the state of the substantially constant speed $\alpha$ [min$^{-1}$]. This control of maintaining the rotation number in the state of the substantially constant speed $\alpha$ [min$^{-1}$] constitutes a first control.

On the other hand, when the output increases and the torque value calculated by the torque calculating part 70 increases to be larger than A [Nm], the throttle opening degree control part 72 performs control based on a torque value (described in detail later) to provide control of increasing the opening degree of the intake throttle valve 6 to make the rotation number larger than α [min$^{-1}$] as shown in FIG. 3. Therefore, in two-dimensional coordinates of the torque and the engine rotation number shown in FIG. 3, the output is caused to move along an arrow E. In this way, the output is prevented from moving upward along the Y-axis (torque axis) so as to suppress a rise of the torque. As a result, even the maximum torque at the time of the required maximum output achieved at the rotation number of β [min$^{-1}$] is located lower than the easily-knocking region indicated by C in FIG. 3, so that the knock is prevented from occurring.

The control indicated by an arrow F in FIG. 3 is control of a reference example. In this control, the engine rotation number is always maintained at γ [min$^{-1}$] (in this example, γ satisfies α<γ<β). In this control, since the rotation number is kept constant irrelevantly to the torque value, the torque increases along the Y-axis (increases in parallel with the Y-axis), and the torque reaches the easily-knocking region. Therefore, a knock detecting system is essential for this control.

In contrast, the control of this embodiment causes no knock even at the maximum torque when the required maximum output is generated. Therefore, the knock detecting system is basically unnecessary. In the control of this embodiment, as shown in FIG. 3, the rotation number at the time of generating the rated output is set to α [min$^{-1}$] smaller than γ [min$^{-1}$] of the reference example. By performing the rated operation at the lower-speed rotation number in this way, the thermal efficiency is improved.

In FIG. 3, A [Nm] and B [Nm] may have any values as long as B>A is satisfied. In an example, the α [min$^{-1}$] defined as the first rotation number can be 1800 [min$^{-1}$]; the β [min$^{-1}$] defined as the rotation number generating the required maximum output can be 2000 [min$^{-1}$]; the γ [min$^{-1}$] can be 1900 [min$^{-1}$]; the kW line of the required rated output can be 37.8 kW line; and the kW line of the required maximum output can be 43.8 kW line. However, a value other than 1800 can be employed as the α defined as the first rotation number; a value other than 2000 can be employed as the β defined as the rotation number generating the required maximum output; a kW line other than the 37.8 kW line can be employed as the kW line of the required rated output; and a kW line other than the 43.8 kW line can be employed as the kW line of the required maximum output. The α and the β may be any values as long as β>α is satisfied, and the kW line of the required rated output and the kW line of the required maximum output may be lines of any values as long as the kW line of the required maximum output is larger than the kW line of the required rated output.

Figure 4:
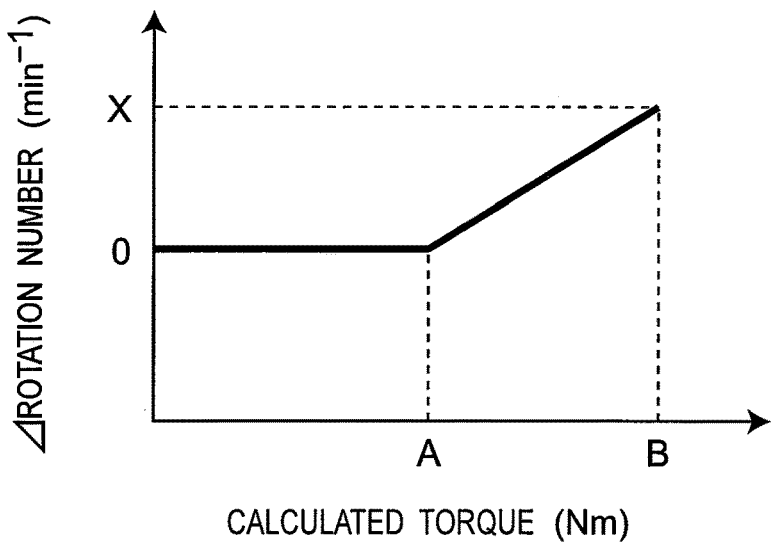
FIG. 4 is a diagram of a locus of this control on a two-dimensional plane of a calculated torque and the variation rotation number.

FIG. 4 is a diagram of a locus of this control on a two-dimensional plane of the calculated torque and the variation rotation number. This map is stored in the built-in memory 73.

As shown in FIG. 4, in this control, if the torque calculated by the torque calculating part 70 (see FIG. 2) is equal to or less than A [Nm], the first control described above is provided such that the Δ rotation number (variation rotation number) becomes zero. If the torque calculated by the torque calculating part 70 is greater than A [Nm] and not greater than B [Nm], a second control is provided to increase the rotation number in accordance with a linear function (linearly) as the calculated torque increases from A to B and, more specifically, the second control is provided to increase the variation rotation number from 0 to X [min$^{-1}$] in accordance with a linear function (linearly).

Specifically, if the torque calculated by the torque calculating part 70 is greater than A [Nm] and not greater than B [Nm], the throttle opening degree control part 72 obtains a target rotation number X1 corresponding to the torque value calculated by the torque calculating part 70 based on the map of FIG. 4 and calculates a variation rotation number (X1-X2) [min$^{-1}$] between the target rotation number X1 [min$^{-1}$] and an actual rotation number X2 [min$^{-1}$] calculated from the signal from the rotation speed sensor 38. If this variation rotation number is positive, the throttle opening degree control part 72 controls the intake throttle valve 6 to make the opening degree of the intake throttle valve 6 proportionally larger based on the magnitude of the variation rotation number. On the other hand, if the variation rotation number is negative, the throttle opening degree control part 72 controls the intake throttle valve 6 to make the opening degree of the intake throttle valve 6 proportionally smaller based on the magnitude of the variation rotation number.

Figure 5:
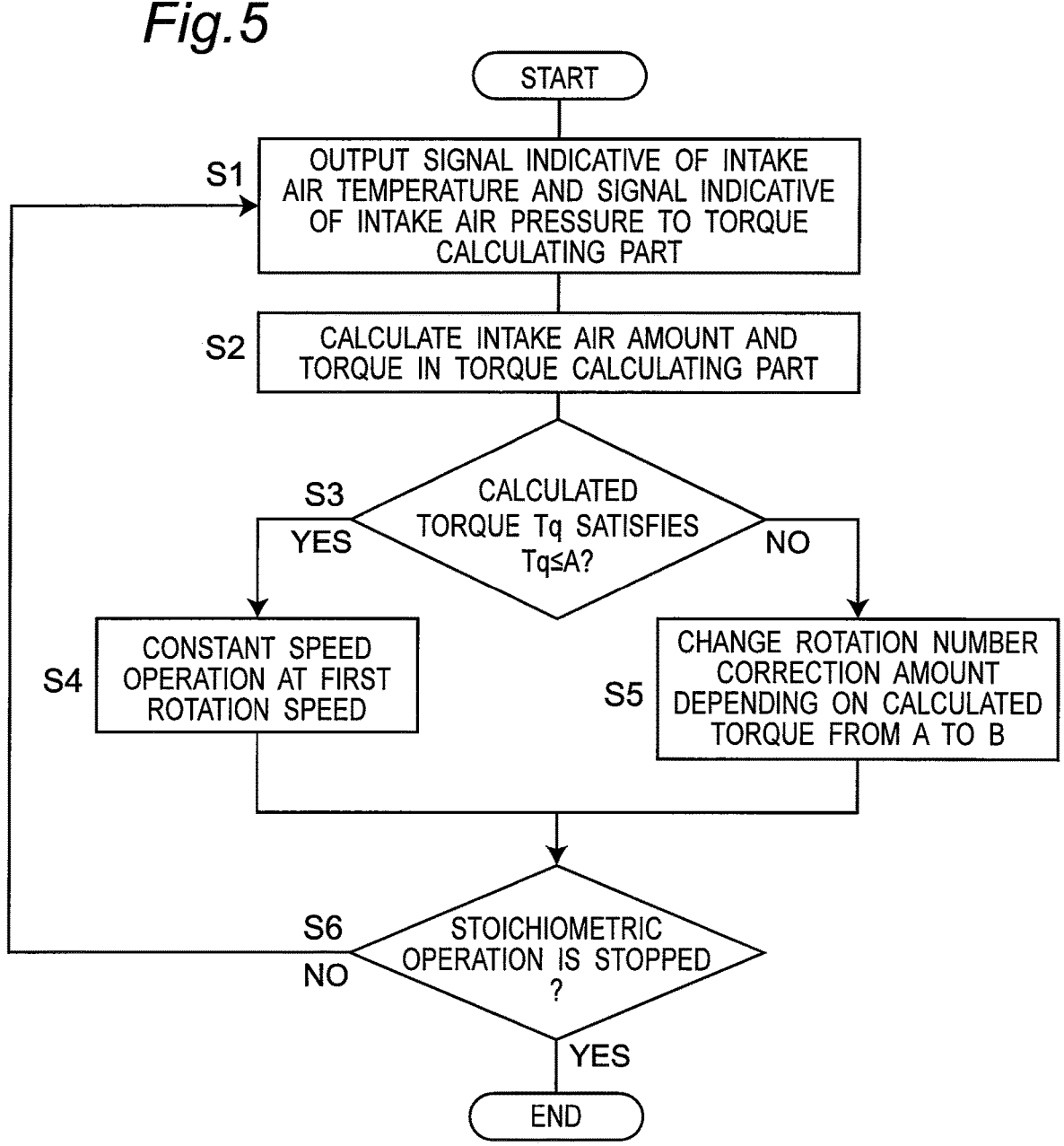
FIG. 5 is a flowchart of the control.

FIG. 5 is a flowchart of the control.

When the control is started, at step S1, a signal indicative of an intake air temperature from the intake air temperature sensor 31 and a signal indicative of an intake air pressure from the intake air pressure sensor 30 are output to the torque calculating part 71. At step S2, the torque calculating part 71 calculates an intake air amount based on D-JETRONIC and calculates a torque corresponding to the intake air amount in a one-to-one relation from the stored map.

At step S3, it is determined whether the calculated torque is A [Nm] or less. If the calculated torque is A [Nm] or less, the control goes to step S4, and the throttle opening degree control part 72 controls the opening degree of the throttle 6 such that the rotation number speed sensor 38 indicates the first rotation number α [min$^{-1}$]. The throttle opening degree control part 72 then performs a constant speed operation at the rotation number set to the first rotation number α [min$^{-1}$] for a first predetermined time.

Subsequently, at step S6, it is determined whether a signal for stopping the stoichiometric operation is input to the ECU 10 from an operating part not shown. If the signal for stopping the stoichiometric operation is not input to the ECU 10, the control returns to step S1 or, if the signal for stopping the stoichiometric operation is input to the ECU 10, the control is ended.

On the other hand, if the calculated torque is larger than A [Nm] and smaller than B [Nm] at step S4, the control goes to step S5. At step S5, the control described above (described with reference to FIG. 4) is provided to achieve the calculated rotation number from the map representative of the locus of the control on the two-dimensional plane of the calculated torque and the variation rotation number. The operation at the rotation number set to the calculated rotation number is performed for a second predetermined time and the control subsequently goes to step S6. The second predetermined time may be the same as or different from the first predetermined time.

According to the first embodiment, since the stoichiometric operation control part 71 can provide control such that the air excess ratio of the air-fuel mixture mixed by the mixer 25 falls within a stoichiometric range, the stoichiometric operation can be achieved. Therefore, a high output can easily be achieved.

Additionally, while the stoichiometric operation control part 71 provides the control such that the air excess ratio falls within the stoichiometric range in the first control, if the throttle opening degree control part 72 determines that the torque value is equal to or less than A [Nm], the throttle opening degree control part 72 controls the opening degree of the intake throttle valve 6 such that the output shaft rotates at the α [min$^{-1}$] that is the constant rotation number. Therefore, since the A [Nm] is a value causing no knocking, a knocking does not occur while the first control is provided, regardless of the fact that a high output generation performance can be maintained. Moreover, since the control is provided such that output shaft is set to the constant speed α [min$^{-1}$] in the first control, the load applied to the engine can efficiently be increased so that the electric generation etc. can be performed with good efficiency.

On the other hand, in the second control, while the stoichiometric operation control part 71 provides the control such that the air excess ratio falls within the stoichiometric range, if the throttle opening degree control part 72 determines that the torque value is large than the first predetermined value, the throttle opening degree control part 72 controls the opening degree of the intake throttle valve 6 such that the rotation number of the output shaft becomes larger. Therefore, if a larger output is required and the torque value becomes larger than A, the rotation number of the output shaft becomes larger and, thus, the torque value hardly rises while the second control is provided. This is because, as shown in FIG. 3, a line segment indicative of the same output has the same tendency as a curve representative of inverse proportion on the two-dimensional coordinates of the torque on the vertical axis and the rotation number on the horizontal axis. As a result, when the rotation number becomes larger, the torque is made lower on the curve indicative of the same output.

Thus, when a larger output is required, a rapid rise in the torque can be avoided because the rotation number increases. Therefore, according to the first embodiment, since the torque at the time of output of the required maximum output is less than a knocking occurrence region, a knocking does not occur while the second control is provided.

Therefore, the occurrence of knocking can properly be avoided in the entire period of the stoichiometric operation.

According to the first embodiment, the second control causes a variation value of the rotation number varying from the α [min$^{-1}$] to increase in accordance with a linear function as the torque value becomes larger than A [Nm]. Therefore, since the relation between the torque and the variation value of the rotation number is a simple proportional relation, the second control can easily be provided.

In the first embodiment, the torque is calculated based on so-called D-JETRONIC. However, L-JETRONIC may be employed for calculating the torque instead of D-JETRONIC, or an airflow sensor may be provided to calculate the torque based on an intake air amount measured by the airflow sensor. Alternatively, K-JETRONIC may be employed for calculating the torque.

In the first embodiment, the control of the opening/closing degree of the A/F valve 22 enables the control of the range (λ=1.4 to 1.6) of the air excess ratio of the lean operation. However, for example, the lean operation may be disabled by eliminating the A/F valve 22 etc., and only the stoichiometric operation may be able to be performed.

In the first embodiment, as the calculated torque increases from A to B, the second control causes the variation rotation number to increase from 0 to X [min$^{-1}$] in accordance with a linear function (linearly). However, for example, as the calculated torque increases from A to B, the second control may cause the variation rotation number to increase from 0 to X [min$^{-1}$] in accordance with a quadratic curve such as a parabola or in accordance with a tertiary or higher-order curve. In the present invention, as the calculated torque increases from A to B, the second control may cause the variation rotation number to increase along any locus in the range from 0 to X [min$^{-1}$] on the two-dimensional coordinates of the variation rotation number and the calculated torque.

In the first embodiment, the knock detecting means is not included. However, the knock detecting means may be provided to certainly prevent the knocking. According to the first embodiment, since the knock detecting means is not included, the gas engine can be achieved with lower costs as compared to when the knock detecting means is included. Additionally, since the conventional gas engine must retard the ignition timing when avoiding a knock, this leads to a deterioration in fuel consumption (an increase in member thermal load). In contrast, since the knocking can properly be avoided in the present invention, it is basically not necessary to retard the ignition timing for avoiding a knock, and the fuel consumption can be suppressed. However, if a sign of knocking occurs, the ignition timing may be retarded so as to certainly avoid the knocking and securely prevent an abnormal combustion due to the knocking for reliable protection against a piston damage etc.

In the first embodiment, the first control is provided when the torque value is equal to or less than A [Nm], and the second control is provided when the torque value is greater than A and not greater than B. However, the first control may be provided when the torque value is less than A [Nm], and the second control may be provided when the torque value is not less than A and not greater than B. In the first embodiment, the cooling water temperature sensor 32 may not be included.

In the first embodiment, the excess ratio identifying means is the one oxygen sensor 11. However, the excess ratio identifying means may be any means capable of identifying a physical amount from which the air excess ratio can be calculated (identified), and is not limited to the one oxygen sensor 11. For example, multiple oxygen sensors etc. may be employed as the excess ratio identifying means. In the first embodiment, the excess ratio adjusting means is made up of the A/F valve 22 and the solenoid valve 21. However, the means capable of adjusting the air excess ratio (air-fuel ratio) can be configured in any manner depending on specifications and, for example, the excess ratio adjusting means may be made up only of the solenoid valve 21 without including the A/F valve 22.

In the first embodiment, the control is provided irrelevantly to temperature of cooling water for suppressing overheating due to combustion of the air-fuel mixture in a combustion chamber. However, the control may be provided based on the temperature of the cooling water. This is because the possibility of knocking is correlated with the temperature of the cooling water for suppressing overheating due to combustion of the air-fuel mixture and a knocking does not occur when the cooling water is at a predetermined temperature or lower.

Figure 6:
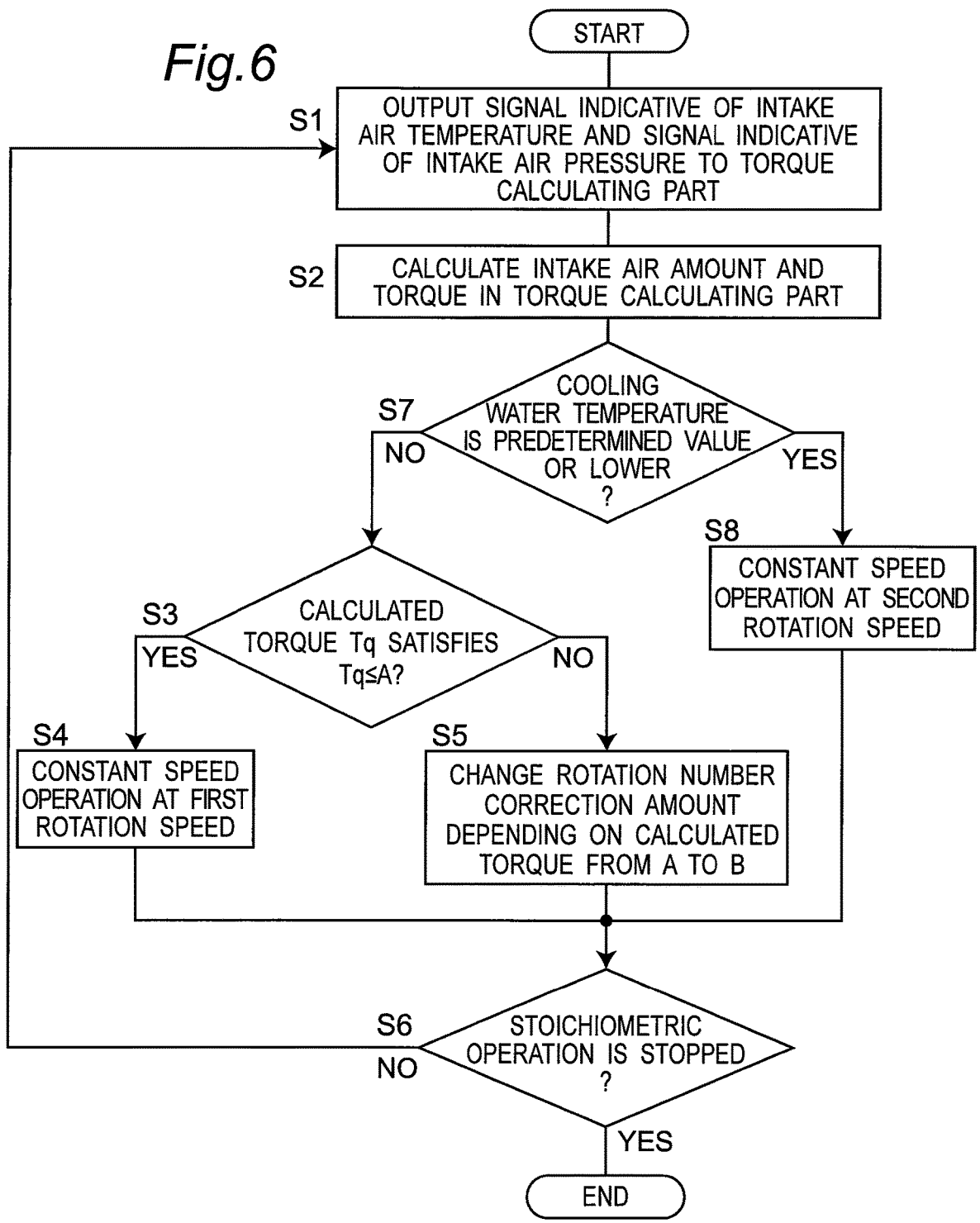
FIG. 6 is a flowchart of control of a second embodiment.

FIG. 6 is a flowchart of control of a second embodiment with considerations given to the temperature of the cooling water.

In the control of the second embodiment, the same steps as the control of the first embodiment are denoted by the same numbers as the steps of the first embodiment and will not be described. The gas engine of the second embodiment is only different in the control and is the same apparatus as the apparatus of the first embodiment shown in FIG. 1. The second embodiment will not be described in terms of the same effects and modification examples as those of the first embodiment.

As shown in FIG. 6, the control of the second embodiment has step S7 executed between step S2 and step S3. At step S7, the ECU 10 receives a signal indicative of the temperature of the cooling water from the cooling water temperature sensor 32 and determines whether the temperature of the cooling water is equal to or less than a second predetermined value, φ [° C.]. The φ [° C.] is a temperature at which a knocking does not occur. If the temperature of the cooling water is equal to or less than φ [° C.], the control goes to step S8.

Although the φ [° C.] defined as the second predetermined value can be, for example, 80 [° C.], the φ [° C.] may be any temperature other than 80[° C.], and the second predetermined value may be any temperature other than 80 [° C.]. This is because the second predetermined value varies depending on specifications of an engine or a position at which the cooling water temperature sensor is disposed.

Subsequently, at step S8, the throttle opening degree control part 72 provides the same control as step S4 such that the rotation number speed sensor 38 indicates a second rotation number δ [min$^{-1}$]. This operation of maintaining the rotation number at the second rotation number δ [min$^{-1}$] is performed for a third predetermined time. This third predetermined time may be the same as at least one of the first predetermined time and the second predetermined time or may be different from both the first predetermined time and the second predetermined time. Subsequently, the control goes to step S6. The control of step S7 and the control of step S8 constitute a third control. On the other hand, if the temperature of the cooling water is larger than the second predetermined value φ [° C.] at step S7, the control goes to step S3 described above. Although the δ [min$^{-1}$] defined as the second rotation number can be, for example, 1800 [min$^{-1}$], the δ may be any value other than 1800 and the second rotation number may be any rotation number other than 1800 [min$^{-1}$].

According to the gas engine of the second embodiment, if the temperature of the cooling water is equal to or less than the second predetermined value φ [° C.] in the third control, the throttle opening degree control part 72 controls the opening degree of the intake throttle valve 6 such that the output shaft rotates at the constant rotation number. Therefore, in this embodiment, the second predetermined value φ [° C.] is a temperature at which a knocking does not occur in the specifications of this example and, therefore, the constant speed operation of the output shaft can be achieved without concern about the occurrence of knocking.

In the second embodiment, the first rotation number for controlling the output shaft in the first control and the second rotation number for controlling the output shaft in the third control may be identical, or the first rotation number for controlling the output shaft in the first control and the second rotation number for controlling the output shaft in the third control may be different from each other.

In the second embodiment, the third control is provided in preference to the first control and the second control if the temperature of the cooling water is equal to or lower than the second predetermined value. However, the third control may be provided in preference to the first control and the second control if the temperature of the cooling water is lower than the second predetermined value. Although the cooling water temperature sensor 32 is located in the vicinity of the cylinder head 3 in the second embodiment, the cooling water temperature sensor may be located in the vicinity of the cylinder of the cylinder head, for example.

In the second embodiment, the control of step S7 based on the temperature of the cooling water is provided between step S2 and step S3. However, in the present invention, the control of step S7 based on the temperature of the cooling water may be provided immediately after the start, may be provided between step S1 and step S2, or may be provided after step S3.

Although the gas engine of the present invention is preferably used in electric generation, the gas engine of the present invention may obviously be used in applications other than electric generation. Moreover, a new embodiment can naturally be established by combining two or more constituent elements from all the constituent elements described in the embodiments and the modification examples.

EXPLANATIONS OF REFERENCE OR NUMERALS 2 intake part
3 cylinder head
6 intake throttle valve
10 ECU
25 mixer
30 intake air pressure sensor
31 intake air temperature sensor
332 cooling water temperature sensor
38 rotation speed sensor
70 torque calculating part
71 stoichiometric operation control part
72 throttle opening degree control part
73 built-in memory

The invention claimed is:

1. A gas engine comprising:
a mixer configured to mix an air and a fuel to generate an air-fuel mixture;
a cylinder head comprising an intake port configured to receive the air-fuel mixture from the mixer;
an intake throttle valve configured to adjust a flow-rate of the air-fuel mixture from the mixer to the intake port;
a torque calculating means for calculating a torque value associated with an output shaft;
an excess ratio identifying means for identifying an air excess ratio of the air-fuel mixture;
an excess ratio adjusting means for adjusting the air excess ratio;
a throttle opening degree control means for controlling an opening degree of the intake throttle valve based on a signal indicative of the torque value from the torque calculating means; and
an excess ratio control means for controlling the excess ratio adjusting means such that the air excess ratio is within a stoichiometric range,
wherein, while the air excess ratio is controlled by the excess ratio control means to be within the stoichiometric range:
if the throttle opening degree control means determines that the torque value is less than a first predetermined value, the throttle opening degree control means is configured to control the opening degree of the intake throttle valve such that the output shaft rotates at a constant first rotation number, or
if the throttle opening degree control means determines that the torque value is greater than the first predetermined value, the throttle opening degree control means is configured to control the opening degree of the intake throttle valve such that a rotation number of the output shaft increases.

2. The gas engine according to claim 1, wherein if the throttle opening degree control means determines that the torque value is greater than the first predetermined value, the throttle opening degree control means is configured to control the opening degree of the intake throttle valve such that the rotation number increases in accordance with a linear function the torque value to be greater than the first predetermined value.

3. The gas engine according to claim 1, further comprising:
a cooling water temperature sensor configured to detect a temperature of a cooling water and to output a signal indicative of the temperature of the cooling water to the throttle opening degree control means,
wherein, when the temperature of the cooling water is less than a second predetermined value, the throttle opening degree control means is configured to control the opening degree of the intake throttle valve such that the output shaft rotates at a constant second rotation number.

4. The gas engine according to claim 3, wherein the cooling water is provided to suppress overheating due to combustion of the air-fuel mixture in a combustion chamber.

5. The gas engine according to claim 1, wherein:
when a temperature of cooling water is greater than a second predetermined value, the throttle opening degree control means is configured to:
perform a comparison between the torque value and the a first predetermined value; and
control the opening degree of the intake throttle valve based on a result of the comparison.

6. A system comprising:
a controller associated with an engine, the controller configured to, while an air excess ratio is controlled to be within a stoichiometric range:
when a temperature of cooling water associated with the engine is greater than a predetermined temperature value:
perform a comparison between a torque value associated with an output shaft and a first predetermined value; and
initiate control of an opening degree of an intake throttle valve based on a result of the comparison
wherein, in response to the result of the comparison indicating that the torque value is less than a first predetermined value, the opening degree of the intake throttle valve is controlled such that the output shaft rotates at a constant first rotation number.

7. The system of claim 6, wherein, when the result of the comparison indicates that the torque value is greater than the first predetermined value, the opening degree of the intake throttle valve is controlled such that a rotation number of the output shaft increases.

8. The system of claim 6, wherein the controller is further configured to, while an air excess ratio is controlled to be within a stoichiometric range:
when the temperature of the cooling water is less than a predetermined temperature value, initiate control the opening degree of the intake throttle valve such that the output shaft rotates at a constant second rotation number.

9. The system of claim 6, further comprising:
the engine coupled to the controller.

10. A system comprising:
a controller associated with an engine, the controller configured to, while an air excess ratio is controlled to be within a stoichiometric range:
when a temperature of cooling water associated with the engine is greater than a predetermined temperature value:
perform a comparison between a torque value associated with an output shaft and a first predetermined value; and
initiate control of an opening degree of an intake throttle valve based on a result of the comparison
wherein, in response to the result of the comparison indicating that the torque value is greater than a first predetermined value, the opening degree of the intake throttle valve is controlled such that a rotation number of the output shaft increases.

11. The system of claim 10, wherein the controller is further configured to, while an air excess ratio is controlled to be within a stoichiometric range:
when the temperature of the cooling water is less than a predetermined temperature value, initiate control the opening degree of the intake throttle valve such that the output shaft rotates at a constant second rotation number.

12. The system of claim 10, further comprising:
the engine coupled to the controller.

* * * * *